Sept. 15, 1959　　J. R. B. ELLIS ET AL　　2,904,592
PRODUCTION OF ACETONE
Filed July 30, 1953
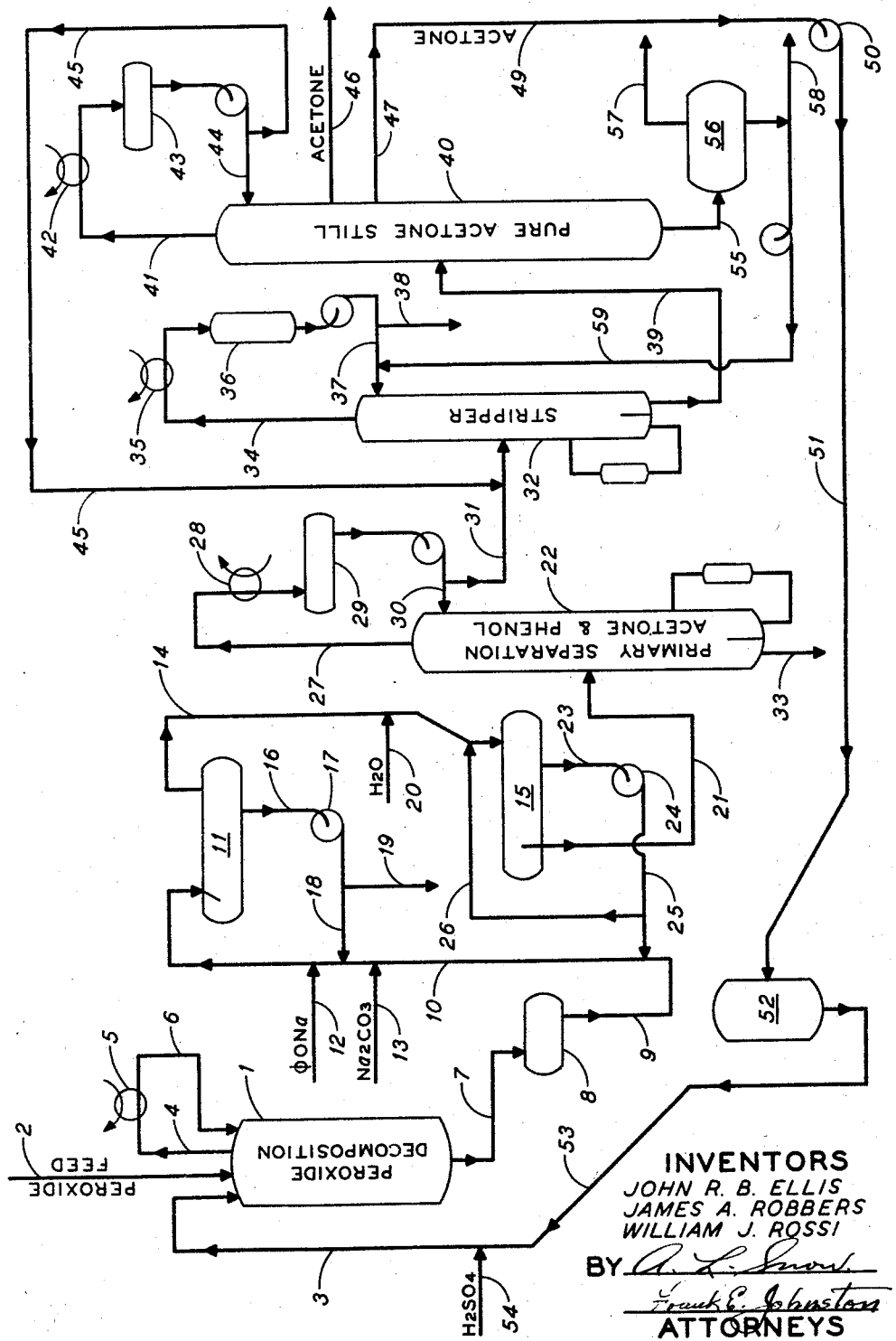
INVENTORS
JOHN R. B. ELLIS
JAMES A. ROBBERS
WILLIAM J. ROSSI
BY
ATTORNEYS United States Patent Office 2,904,592
Patented Sept. 15, 1959

2,904,592

PRODUCTION OF ACETONE

John R. B. Ellis, San Rafael, and James A. Robbers, Berkeley, Calif., and William J. Rossi, Rifle, Colo., assignors to California Research Corporation, San Francisco, Calif., a corporation of Delaware Application July 30, 1953, Serial No. 371,376

6 Claims. (Cl. 260—593)

This invention relates to a process for decomposing cumene hydroperoxide and recovering phenol and substantially pure acetone from the decomposition products.

A process has recently been developed for producing phenol and acetone from cumene. The fundamental chemistry involved in this process was described by Hock and Lang in Berichte, vol. 77, page 257 (1944). Phenol and acetone are produced pursuant to this process by oxidizing cumene to produce cumene hydroperoxide which is then split to form one molecule of phenol and one molecule of acetone. A strong acid catalyst such as sulfuric acid is employed in the splitting step. The resultant mixture comprising phenol, acetone and the acid catalyst is then neutralized, the salt produced during neutralization is removed, and phenol and acetone are recovered by fractional distillation.

Cumene hydroperoxide is a temperature-sensitive material which can decompose with explosive violence at high temperatures. The reaction in which cumene hydroperoxide is split, forming a molecule of phenol and a molecule of acetone, is exothermic and the temperature of the reaction mixture formed in the splitting step must be carefully controlled to avoid uncontrollably rapid rates of decomposition. Control of the temperature of this mixture is a significant problem in successful operation of the process. A further problem faced by the processor is that of devising an economically feasible method for recovering the acetone product at a purity sufficiently high to meet the very rigorous specifications imposed on commercial acetone. The maximum permissible water content set out in the standard specifications for acetone (ASTM designation D-329-33) is equivalent to about 0.4% by weight. A further standard specification for acetone requires that the color of potassium permanganate added to the acetone be retained for a minimum period of 30 minutes. The color retention test is made by adding 1 milliliter of 0.1% by weight of KMnO₄ to 100 milliliters of the acetone sample and allowing the mixture to stand at 25° C. in the dark. In many commercial applications of acetone it is desirable that the acetone have a color retention time in the permanganate test in excess of 4 hours.

Pursuant to the process of the invention set out hereinafter, a combination of operating steps has been devised which enables the processor both to exercise excellent control of the cumene hydroperoxide splitting step and to make a simple and economic recovery of specification acetone.

Pursuant to the invention, cumene hydroperoxide and an acetone diluent are passed into a reaction zone and there contacted with a strong acid to decompose the cumene hydroperoxide, forming phenol and acetone. The reaction zone is cooled by refluxing the acetone. The mixture, comprising phenol and acetone, is withdrawn from the reaction zone, neutralized, and fractionally distilled in a first distillation zone to separate a low boiling fraction comprising acetone and water and a bottoms fraction comprising phenol. The low boiling fraction is fractionally distilled in a second distillation zone to recover a first overhead fraction consisting essentially of purified acetone having a water content below 0.4% by weight and a permanganate retention time in excess of 30 minutes. A second overhead fraction is removed from the second distillation zone at a point below the point of removal of the pure acetone. The second overhead fraction consists essentially of acetone having a water content in the range from 0.75 to 2.5% by weight. This second overhead fraction is returned to the reaction zone to act there as the acetone diluent in the splitting step.

Following neutralization of the cleavage mixture, the salts formed during the neutralization are desirably removed by washing the neutral product with water prior to distillation.

Following the separation of the acetone-water overhead fraction in the first distillation zone, the overhead is desirably passed into a stripping zone from which a very minor overhead fraction consisting principally of acetaldehyde and acetone is removed. This stripped overhead product is then passed into the second distillation zone as described above.

The process of the invention will be better understood by reference to the appended drawing which is a diagrammatic illustration of apparatus and a process flow suitable for the practice of the invention.

A cumene hydroperoxide feed is passed into reaction zone 1 at a rate of 100 parts by weight of cumene hydroperoxide per hour. 100 parts by weight of cumene hydroperoxide concentrate will ordinarily contain about 1.2 parts by weight of cumene, 7.5 parts by weight of dimethyl phenyl carbinol, 1.7 parts by weight of acetophenone, and minor amounts of other impurities. 30 parts by weight of acetone and 0.80 part by weight of sulfuric acid per hour are introduced into reaction zone 1 through line 3. This acetone has a water content in the range from 0.5 to 5% by weight, preferably from 0.75 to 2.5% by weight, and most desirably from 0.75 to 1.5% by weight. Cumene hydroperoxide decomposes in reaction zone 1, forming phenol and acetone. The decomposition mixture in reaction zone 1 is cooled by the vaporization of acetone. Acetone vapors pass from reaction zone 1 through line 4 and condenser 5 where the vapors are condensed and then returned through line 6 to reaction zone 1. The decomposition products are withdrawn from reaction zone 1 through line 7 and passed into surge drum 8 which is desirably provided to prevent any back flow of liquid from the processing steps accomplished down stream. The decomposition mixture is passed from surge drum 8 through lines 9 and 10 into washing zone 11. Sodium phenate is passed through line 12 into line 10 to neutralize the sulfuric acid contained in the reaction mixture and sodium carbonate is passed through line 13 into line 10 to buffer the neutral product. The quantity of sodium phenate introduced through line 12 may be adjusted to be equivalent to the sulfuric acid contained in the decomposition mixture. A lower aqueous phase is removed from washer 11 through line 16 and forced by pump 17 through line 18 into line 10 for recirculation to washer 11. Water containing the salts produced during the neutralization is removed from the system through line 19 and treated subsequently for the recovery of dissolved acetone and phenol. An upper layer consisting principally of phenol, acetone and water is withdrawn from washer 11 through line 14 and passed into a second washer 15. Fresh wash water is introduced into line 14 through line 20 at the rate of about 100 parts by weight per hour. A lower water phase is removed from washer 15 through line 23 and forced by pump 24 through line 25 into line 10 for return to washer 11. A portion of the water is diverted from line 25 to line 26 and passed into line 14 for return to washer 15. An upper phase consisting predominantly of phenol, acetone and water is removed from washer 15 and passed through line 21 into a first distillation zone 22. An overhead fraction containing about 60 parts by weight of acetone, 21 parts by weight of water, and minor amounts of impurities is withdrawn from distillation zone 22 through line 27, passed through condenser 28 where it is condensed, and then into reflux drum 29. Reflux is returned from drum 29 through line 30 to distillation zone 22. A bottoms fraction comprising phenol and water is withdrawn from distillation zone 22 through line 33. Overhead product from distillation zone 22 is withdrawn from line 30 and passed through line 31 into stripping zone 32. An overhead fraction is withdrawn from stripping zone 32 through line 34 and passed through condenser 35 where it is condensed and then passed into reflux drum 36. Condensate is withdrawn from reflux drum 36 and returned to the upper portion of stripping zone 32 through line 37. A small volume stream consisting of approximately equal parts by weight of acetaldehyde and acetone is withdrawn from line 37 through line 38 at the rate of about 0.4 parts by weight per hour. Stripped product is withdrawn from stripping zone 32 through line 39 and passed into a second distillation zone 40. Three overhead fractions are desirably removed from distillation zone 40. The first fraction is withdrawn from the upper part of distillation zone 40 through line 41, passed through condenser 42 into reflux drum 43, and returned from reflux drum 43 to the distillation zone as reflux through line 44. A portion of this first overhead is withdrawn from line 44 through line 45 and passed into line 31 for return to stripping zone 32. In this manner small amounts of residual permanganate reducing material are removed from the acetone. A second overhead fraction consisting of specification acetone is withdrawn from the distillation zone through line 46 as a final product. Specification acetone is withdrawn at the rate of about 29 parts by weight of acetone per hour. This acetone has a water content of about 0.3% by weight and a permanganate retention period of 4 hours or more. A third overhead stream is withdrawn from distillation zone 40 through line 47 from trays in approximately the middle portion of the rectification section of distillation zone 40. This third overhead fraction is withdrawn at the rate of about 30 parts by weight of acetone per hour and this acetone has a water content of about 1% by weight. The third overhead fraction is passed through line 49 and forced through line 51 by pump 50 into acetone surge drum 52. Acetone is withdrawn from surge drum 52 and passed through line 53 into line 3. Sulfuric acid is passed through line 54 into line 3 to catalyze the decomposition of cumene hydroperoxide in reaction zone 1. An aqueous bottoms fraction is withdrawn from distillation zone 40 through line 55. The bottoms fraction consists principally of water and contains about 20% of organic impurities. The bottoms fraction is desirably settled in tank 56 to separate an upper organic layer which is withdrawn through line 57 and a lower aqueous layer, part of which is withdrawn via line 58 and the remainder of which is returned to stripper 32 via lines 59 and 37.

The salts formed during the neutralization of the cleavage mixture are most advantageously removed by the water washing procedure above described. However, a fair degree of salt removal can be accomplished by filtration or by flash vaporization.

Considerable advantage attends the purification of the acetone product and simultaneous control of the temperature in the reaction zone in the manner above described. Distillation column 40 must be operated at a reflux ratio of 5:1 or higher to recover specification acetone when operating in the manner described. As indicated, the acetone product withdrawn through line 46 has a permanganate color retention period of 4 hours or more and a water content of about 0.3% by weight. The recycle acetone stream removed from distillation zone 40 through line 47 has a very low permanganate color retention period of the order of 1 to 5 minutes and a water content of about 1%. The low permanganate color retention period of this acetone stream appears to be due to the presence of minor amounts of unsaturated material such as methyl vinyl ketone and croton aldehyde. These materials are quite reactive and during the recycle through the decomposition step, etc. are apparently decomposed and do not accumulate in the system.

Since approximately half of the total acetone fed to distillation zone 40 is withdrawn as a side cut through line 47, the reflux ratio below the point of withdrawal is reduced to the order of about 2:1. If this recycle step were omitted, a very much more elaborate distillation zone 40 would be required to achieve even a reasonably high recovery of specification acetone. A further requirement for a more elaborate distillation zone 40 would be imposed by the low maximum water content permitted by acetone specifications.

The process as above described has a further advantage in that acetone of very low water content is provided for use as the acetone diluent in reaction zone 1. In order to accomplish complete and rapid splitting of cumene hydroperoxide, it is necessary to have a high hydrogen ion concentration in the total water contained in reaction zone 1. For example, if sulfuric acid is used as the acid catalyst in the splitting step, its concentration should be about 30% by weight based on the total water contained in reaction zone 1. The use of a wetter acetone as the diluent necessitates an increased residence time for the stock in reaction zone 1 in order to achieve the complete splitting of the cumene hydroperoxide. This increased time of contact in the acid media results in decreased yields of phenol and acetone from the cumene hydroperoxide because of side reactions. Further, if it is attempted to employ wetter acetone as the diluent, larger quantities of acid catalyst are required to accomplish the splitting and the rate of splitting even if the presence of the added acid is reduced. The use of additional acid in the splitting step necessarily increases the quantity of inorganic salt produced in the neutralization of the cumene hydroperoxide decomposition mixture and imposes a greater burden on the salt removal facilities.

The temperature of the reaction mixture in reaction zone 1 must be closely controlled at about 170° F. to obtain maximum yields of phenol and acetone. Refluxing of acetone provides an excellent means of controlling this temperature. In order to achieve good temperature control and reasonable flexibility in operation, the quantity of acetone recycled from distillation zone 40 through lines 49, 51, 53 and 3 to reaction zone 1 should be such that from about .25 to 1.5 moles of acetone per mole of cumene hydroperoxide are introduced into reaction zone 1. Desirably, approximately 1 mole of acetone per mole of cumene hydroperoxide is introduced into reaction zone 1 and approximately one-half of the total acetone fed to distillation zone 40 is removed as specification acetone product, while approximately one-half of the acetone contained in the feed to distillation zone 40 is returned to reaction zone 1.

We claim:

1. A process for producing phenol and acetone from cumene hydroperoxide which comprises passing the cumene hydroperoxide and an acetone diluent into a reaction zone and there contacting the mixture with a strong acid to decompose the cumene hydroperoxide forming phenol and acetone, cooling the reaction zone by refluxing acetone, withdrawing the decomposition mixture comprising phenol and acetone from the reaction zone, neutralizing the decomposition mixture, fractionally distilling the neutral decomposition mixture in a first distillation zone to separate a low boiling fraction comprising acetone and water and a bottoms fraction comprising phenol, fractionally distilling the low boiling fraction in a second distillation zone to recover two overhead fractions, a lower boiling first overhead fraction consisting essentially of purified acetone having a water content below 0.4% by weight and a second higher boiling overhead fraction consisting essentially of acetone having a water content in the range from 0.5 to 5.0% by weight and returning said second overhead fraction to the reaction zone as the specified acetone diluent.

2. A process for producing phenol and acetone from cumene hydroperoxide which comprises passing the cumene hydroperoxide and an acetone diluent into a reaction zone and there contacting the mixture with a strong acid to decompose the cumene hydroperoxide forming phenol and acetone, cooling the reaction zone by refluxing acetone, withdrawing the decomposition mixture comprising phenol and acetone from the reaction zone, neutralizing the decomposition mixture, washing the neutral mixture with water to remove salts, fractionally distilling the neutral decomposition mixture in a first distillation zone to separate a low boiling fraction comprising acetone and water and a bottoms fraction comprising phenol, fractionally distilling the low boiling fraction in a second distillation zone to recover two overhead fractions, a lower boiling first overhead fraction consisting essentially of purified acetone having a water content below 0.4% by weight and a higher boiling second overhead fraction consisting essentially of acetone having a water content in the range from 0.75 to 2.5% by weight and returning said second overhead fraction to the reaction zone as the specified acetone diluent.

3. A process for producing phenol and acetone from cumene hydroperoxide which comprises passing the cumene hydroperoxide and from .25 to 1.5 moles of acetone diluent per mole of cumene hydroperoxide into a reaction zone and there contacting the mixture with a strong acid to decompose the cumene hydroperoxide forming phenol and acetone, cooling the reaction zone by refluxing acetone, withdrawing the decomposition mixture comprising phenol and acetone from the reaction zone, neutralizing the decomposition mixture, washing the neutral mixture with water to remove salts, fractionally distilling the neutral decomposition mixture in a first distillation zone to separate a low boiling fraction comprising acetone and water and a bottoms fraction comprising phenol, fractionally distilling the low boiling fraction in a second distillation zone to recover two overhead fractions, a lower boiling first overhead fraction consisting essentially of purified acetone having a water content below 0.4% by weight and a higher boiling second overhead fraction consisting essentially of acetone having a water content in the range from 0.75 to 2.5% by weight and returning said second overhead fraction to the reaction zone as the specified acetone diluent.

4. A process for producing phenol and acetone from cumene hydroperoxide which comprises passing the cumene hydroperoxide and from 0.25 to 1.5 moles of an acetone diluent per mole of cumene hydroperoxide into a reaction zone and there contacting the mixture with a strong acid to decompose the cumene hydroperoxide forming phenol and acetone, cooling the reaction zone by refluxing acetone, withdrawing the decomposition mixture comprising phenol and acetone from the reaction zone, neutralizing the decomposition mixture, washing the neutral mixture with water to remove salts, fractionally distilling the neutral decomposition mixture in a first distillation zone to separate a low boiling fraction comprising acetone and water and a bottoms fraction comprising phenol, fractionally distilling the low boiling fraction in a second distillation zone to remove a minor overhead fraction comprising volatile impurities including acetaldehyde, fractionally distilling the bottoms fraction from the second distillation zone in a third distillation zone to recover two overhead fractions, a lower boiling first overhead fraction consisting essentially of purified acetone having a water content below 0.4% by weight and a higher boiling second overhead fraction consisting essentially of acetone having a water content in the range from 0.75 to 2.5% by weight and returning said second overhead fraction to the reaction zone as the specified acetone diluent.

5. A process for producing phenol and acetone from cumene hydroperoxide which comprises passing the cumene hydroperoxide and an acetone diluent into a reaction zone and there contacting the mixture with a strong acid to decompose the cumene hydroperoxide forming phenol and acetone, cooling the reaction zone by refluxing acetone, withdrawing the decomposition mixture comprising phenol and acetone from the reaction zone, neutralizing the decomposition mixture, fractionally distilling the neutral decomposition mixture in a first distillation zone to separate a low boiling fraction comprising acetone and water and a bottoms fraction comprising phenol, fractionally distilling the low boiling fraction in a second distillation zone, withdrawing from the upper portion of the second distillation zone a dry acetone fraction having a water content below 0.4% by weight, withdrawing from an intermediate point in the second distillation zone a relatively wet acetone fraction having a water content higher than that of the dry acetone fraction but below about 5% by weight, and returning the relatively wet acetone fraction to the reaction zone as the specified acetone diluent.

6. A process for producing phenol and acetone from cumene hydroperoxide which comprises passing a cumene hydroperoxide and an acetone diluent into a reaction zone and there contacting the mixture with a strong acid to decompose the cumene hydroperoxide forming a reaction product mixture comprising phenol, acetone and minor proportions of impurities, cooling the reaction zone by refluxing acetone, withdrawing the decomposition mixture comprising phenol and acetone from the reaction zone, neutralizing the decomposition mixture, fractionally distilling the neutralized decomposition mixture in a first distillation zone to separate a low boiling overhead fraction comprising acetone and water and a bottoms fraction comprising phenol, fractionally distilling the low boiling fraction in a second distillation zone to separate a minor overhead fraction comprising volatile impurities and a very minor proportion of the acetone and a bottoms fraction consisting essentially of acetone and water, fractionally distilling the last-mentioned bottoms fraction in a third distillation zone, withdrawing from the upper portion of the third distillation zone a dry acetone fraction having a water content below about 0.4% by weight, withdrawing from an intermediate point in the third distillation zone a relatively wet acetone fraction having a substantially higher water content than that of the dry acetone fraction and returning the relatively wet acetone fraction to the reaction zone as the specified acetone diluent.

References Cited in the file of this patent

UNITED STATES PATENTS

| | | |
|---|---|---|
| 2,597,497 | Joris | May 20, 1952 |
| 2,662,848 | Emerson et al. | Dec. 15, 1953 |
| 2,663,735 | Filar et al. | Dec. 22, 1953 |